Aug. 18, 1964     C. J. DEMRICK     3,145,061
WHEEL COVER
Filed Nov. 14, 1962     2 Sheets-Sheet 1
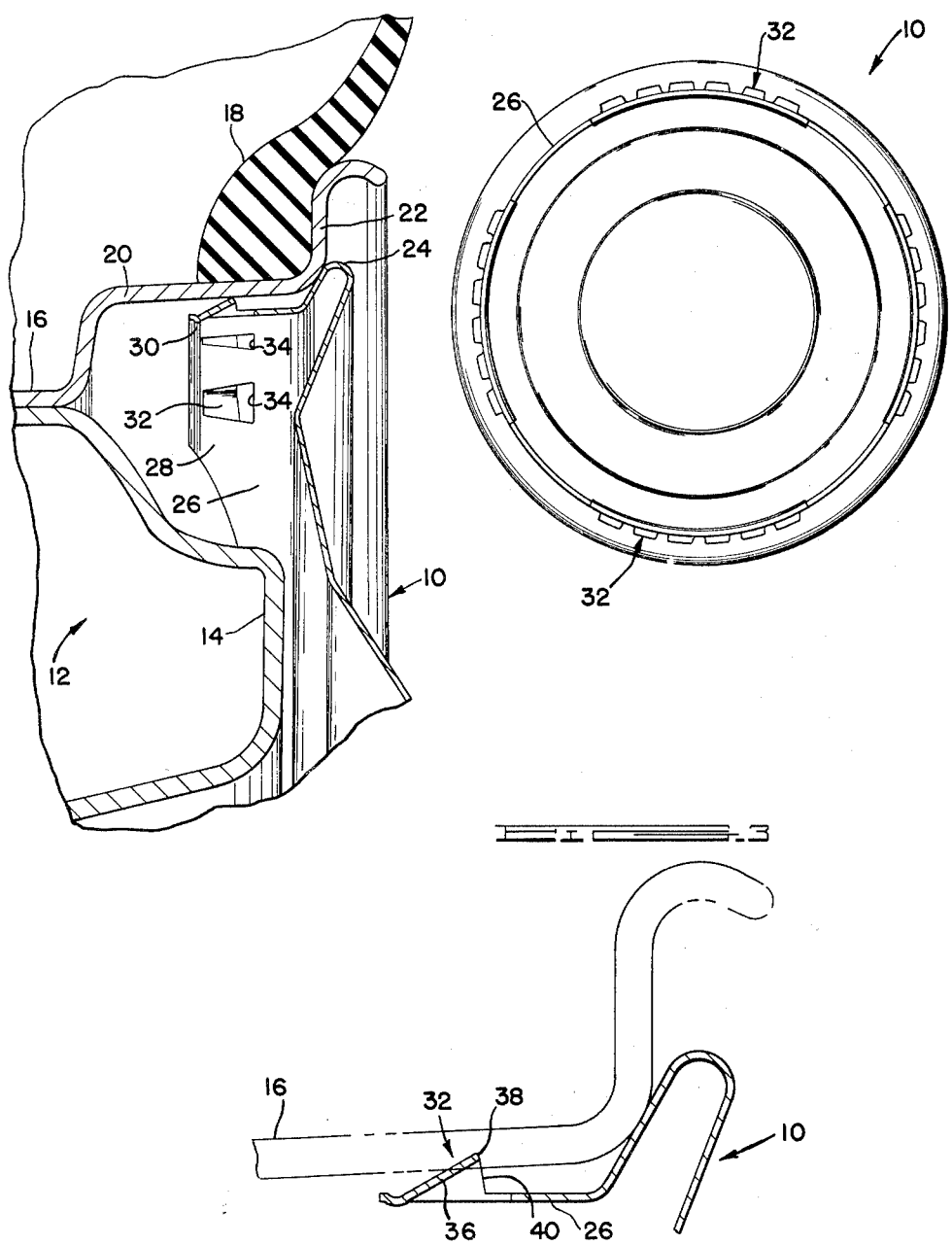
INVENTOR.
CARL J. DEMRICK
BY
OLSEN AND STEPHENSON
ATTORNEYS

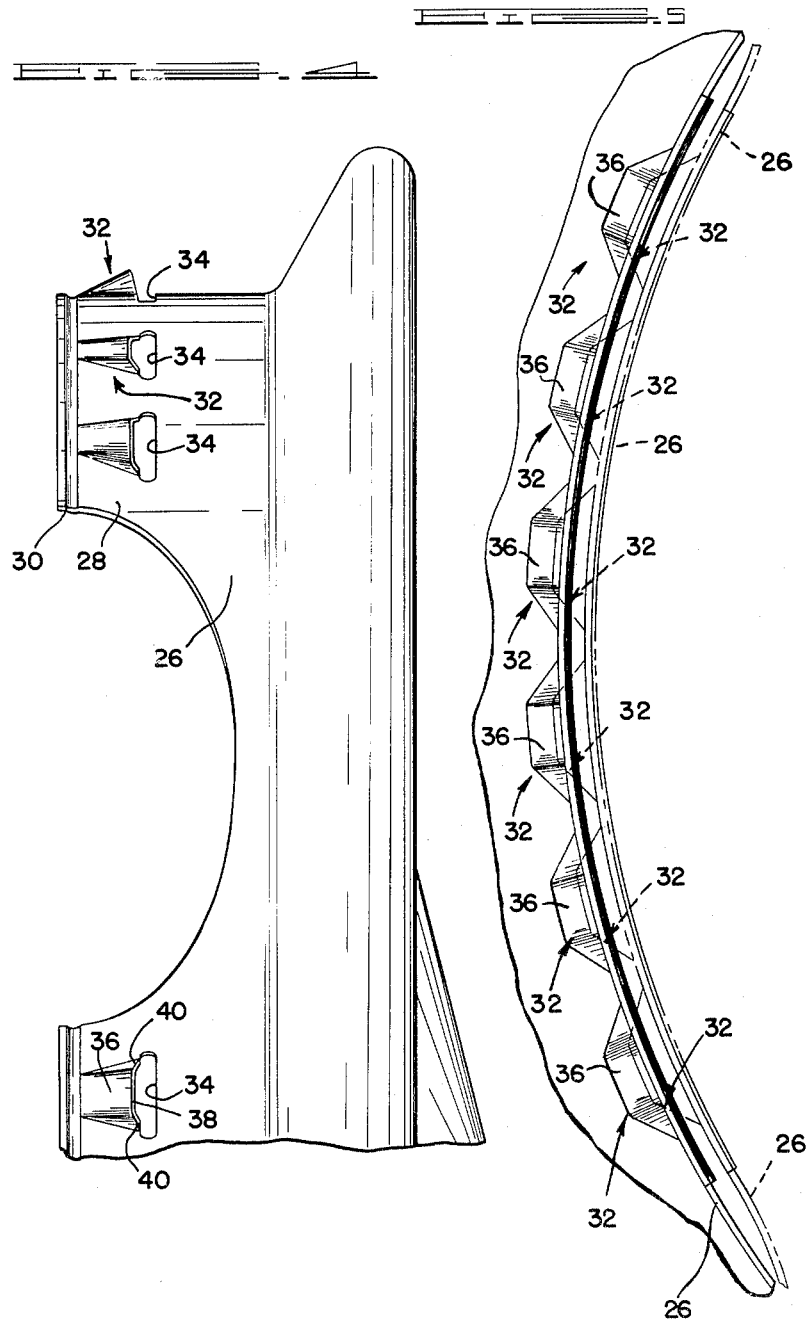

United States Patent Office 3,145,061
Patented Aug. 18, 1964

3,145,061
WHEEL COVER
Carl J. Demrick, Birmingham, Mich., assignor to Avis Industrial Corporation, Almont, Mich., a corporation of Delaware
Filed Nov. 14, 1962, Ser. No. 237,651
6 Claims. (Cl. 301—37)

The present invention relates to improvements in wheel covers such as are adapted to be applied to the outer sides of vehicle wheels, and more particularly concerns improvements in the means for retention of such covers on the wheels.

It is an object of the present invention to provide an improved wheel cover for the outer side of a wheel structure which cover can be easily and conveniently applied to the wheel structure and can conveniently be pried free from the wheel structure without damage to either part and so that both parts can be continuously used for an extended period of time.

It is another object of the present invention to provide a cover of the foregoing character which is constructed and arranged so that it can accommodate wheel structures having a normally wide range of tolerances in the dimensions of the flanges on which the cover is adapted to be mounted and which will continue to provide optimum retention characteristics under these conditions.

It is still another object of the present invention to provide a cover formed from a blank of sheet metal wherein the retention means is constructed and arranged so that relatively deep penetration and gripping engagement of the rim flange is accomplished for a given size of blank material from which the cover is made.

It is still another object of the present invention to provide a cover of the foregoing character which has a continuous annular flange provided with a plurality of axial extensions in which relatively rigid retention elements are formed therein and wherein the extensions are constructed and arranged and are resiliently yieldable to accommodate substantially all of the radially inwardly deflections of the retention elements that must occur when the cover is pressed onto a vehicle wheel.

Other objects of this invention will appear in the following description and appended claims, reference being had to the accompanying drawings forming a part of this specification wherein like reference characters designate corresponding parts in the several views.

In the drawings:
FIGURE 1 is a fragmentary radial sectional view through a wheel showing a wheel cover embodying the features of the present invention applied to the outer side of the wheel;
FIGURE 2 is a rear elevational view of the wheel cover, drawn to reduced scale;
FIGURE 3 is an enlarged fragmentary sectional view of the outer periphery of the wheel cover in its unstressed shape and showing in phantom a fragmentary section of the rim of the wheel on which it is adapted to be mounted;
FIGURE 4 is a fragmentary enlarged side elevation of the wheel cover; and
FIGURE 5 is an enlarged fragmentary rear elevation illustrating a portion of the cover in which the retention elements are located and illustrating in phantom the inward deflection that occurs when the cover is pressed onto a wheel rim.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The wheel cover 10, according to the present invention, is constructed and arranged to be applied to the outer side of a vehicle wheel 12 including a wheel body 14, a tire rim 16 and a pneumatic tire 18. The tire rim 16 is of a conventional type and includes an intermediate axial flange 20 and a side or radial flange 22 which extends radially outwardly from the axial flange 20.

The cover 10, manufactured from sheet metal, has an ornamental outer side which conceals the wheel body 14 and portions of the tire rim 16 and has a rearwardly turned outer peripheral edge 24 which is joined to the axially inwardly continuous annular flange 26. As can be seen in FIGURE 1, the axially inwardly extending flange 26 is located radially inwardly of the peripheral edge 22, so that the latter is adapted to seat on the side flange 22 of the rim 16 and the annular flange 26 is adapted to extend in spaced relation into the axial flange 20.

The annular flange 26 is continuous throughout its circumference and is provided with a plurality of axial extensions 28 which are arcuately curved in a circumferential direction to conform with the circumference of the annular flange 26.

The extensions 28 are provided at their axially inner ends with embossments or reinforcing structures 30 for rigidifying the ends so that such ends resist efforts to distort or modify the arcuate configuration of the extensions. The continuous annular flange 26 and its extensions 28 are made from any suitable material, such as stainless steel or the like, which has resilient spring properties, so that the extensions 28 are resiliently yieldable in a radial direction. Furthermore, the extensions 28 are an integral part of the continuous annular flange 26, and therefore, the extensions 28 will, by virtue of their common connection, mutually resist resilient yielding in a radial direction. This latter characteristic of the extensions 28 is further enhanced by the reinforcing structures or embossments 30 at their inner terminal ends, which structures are in a common plane normal to the cover 10 axis and each extends circumferentially the width of its associated extension 28, whereby such structures seek to maintain the arcuate configurations of the extensions so that such extensions yield essentially in a radially inward direction as arcuate structural elements.

For the purpose of retaining the cover 10 on the vehicle wheel 12, each of the extensions 28 has a plurality of retention elements 32 formed therein. In the illustrated embodiment of the invention, four uniformly spaced extensions 28 are provided, and each of the extensions 28 has six circumferentially aligned retention elements 32. At substantially the mid-portion of the axial length of each extension 28 a plurality of circumferentially aligned slots 34 have been cut, and the retention elements 32 are pressed radially outwardly from the material located between these slots 34 and the reinforced terminal end 30.

Each retention element has a radially and axially outwardly inclined portion 36 which terminates in the edge 38 which is adapted to retainingly grip the axial flange 20 of the tire rim 16. The gripping edge 38 constitutes the axially inner edge of the slot 34 with which the particular retention element 36 is associated. The inclined portion 36 is integrally connected and substantially rigidly supported in its inclined position by the side portions 40. Therefore, when the cover is pressed onto the vehicle wheel, the inclined portion of each retention element 32 will wedgingly engage the axial flange 20 of the tire rim 16, and being rigidly connected to the main body of the extension 28 will transmit the radial forces to the extension 28 causing the latter to resiliently yield in a radially inwardly direction until the cover 10 has been fully pressed onto the wheel 12, to the position shown in FIGURE 1. In this position, the edge 38 of each retention element 32 will bitingly grip the axial flange 20 and will resist forces tending to pull the cover away from the tire rim 16.

As seen in FIGURE 3, when the cover is in its unstressed condition before being pressed onto the tire rim 16, the annular flange 26 will be in the position shown. The rim 16 has been illustrated in phantom to illustrate that the radially outermost positions of the retention elements 32 normally will be in a circle somewhat greater than that defined by the rim at the location where the retention elements are adapted to retainingly engage the axial flange 20, but as a result of pressing the cover onto the rim 16, each of the extensions 28 will be deflected radially inwardly to the position shown in FIGURE 1. The group of retention elements will be deflected as a unit radially inwardly, as shown by the phantom lines in FIGURE 5.

One of the features of the present invention is the extent of axial penetration of the axial flange 20 that occurs in proportion to the amount of blank metal stock that is required for manufacturing the wheel cover 10. It is to be understood that it is desirable to have the gripping engagement of the cover occur as far into the axial flange 20 as is permissible without requiring additional metal when manufacturing the wheel cover. Since the cover 10 is circular, adding to the length of the extensions 28 is realized only by adding a substantial amount of material to the initial blank piece of sheet metal that was used to manufacture the cover 10, and all portions of such metal that are trimmed from the blank during manufacture become wasted material, adding to the cost of the cover. Thus, it is desirable to have the retention elements located as near the axially inner edge of the axial flange as possible, but without adding to the length of the extensions 28. When the retention elements are so located, it is found that the cover can more readily accommodate greater tolerances in the dimensions of the rim 16 while still maintaining the desired retention properties of the cover. This is so, because the rim flange 20 converges inwardly and deeper penetration of the retention elements 32 allows greater inward deflection of the extensions 28, and therefore, greater radially outward thrust on the part of such extensions.

Another feature of the present invention is the arrangement wherein a plurality of individual retention elements 32 are circumferentially aligned in each extension 28 and the latter has a reinforced terminal edge tending to maintain the arcuate shape of the extension 28 when the extension resiliently yields in a radially inwardly direction. This has the effect of causing the retention elements 32 in that extension 28 to function, in effect, as a single gripping unit, as illustrated in FIGURE 5, and the arcuate configuration of the extension 28 has the effect of providing greater resistance to the inward deflection of the extension, and conversely results in a greater radially outwardly thrusting action of the continuous annular flange 26 that is transmitted to the gripping edges 38 which retainingly engage the axial flange 20 and cooperate in holding the cover on the rim 16.

Having thus described my invention, I claim:

1. In a wheel structure having rim and body parts including a side flange and an axial flange located radially and axially inward of the side flange, a cover for disposition at the outer side of the wheel structure having a rearwardly turned outer peripheral edge and having extending rearwardly and radially inwardly from said edge a continuous annular flange provided with a plurality of extensions resiliently yieldable in a radial direction and mutually resisting such yielding by the common connection through said annular flange, said extensions being arcuately curved at their inner terminal ends in conformity with the circumference of the annular flange and having at such terminal ends circumferentially extending deformations for rigidifying such terminal ends for resisting deformation of the arcuate configuration of the extensions, each of said extensions having a series of circumferentially aligned slots therein and a series of retention elements deflected radially outwardly from the material of the extensions axially inward of the slots so that a series of circumferentially aligned retention elements are provided extending radially and axially outwardly and having the inner edges of said slots defining radially and axially outwardly facing straight edge portions in circumferential alignment for retainingly engaging said axial flange.

2. In a wheel structure having rim and body parts including a side flange and an axial flange located radially and axially inward of the side flange, a cover for disposition at the outer side of the wheel structure having a rearwardly turned outer peripheral edge and having extending rearwardly and radially inwardly from said edge a continuous annular flange provided with a plurality of extensions resiliently yieldable in a radial direction and mutually resisting such yielding by the common connection through said annular flange, said extensions being arcuately curved in conformity with the circumference of the annular flange, each of said extensions having between its ends a series of circumferentially aligned slots and a series of relatively rigid retention elements deflected radially outwardly from the material of said extensions at locations immediately inward axially of said slots, each of said retention elements having for its radially and axially outer edge the inner edge of the associated slot and being integrally joined at its sides and innermost end with its extension, the outer edges of said retention elements having generally straight portions in circumferential alignment defining a circle which before the cover is mounted on the wheel structure is larger than the diameter of said axial flange, and when the cover is mounted in operative position at the outer side of the wheel structure such circle is reduced to the diameter of the axial flange where engaged by such edges, the reduction in diameter of said circle being realized essentially by radially inward deflection of the extensions.

3. In a wheel structure having rim and body parts including a side flange and an axial flange located radially and axially inward of the side flange, a cover disposed at the outer side of the wheel structure having an outer circular portion seated on said side flange, and having extending rearwardly and radially inwardly from said circular portion a continuous annular flange provided with a plurality of extensions resiliently yieldable in a radial direction and mutually resisting such yielding by the common connection through said flange, each of said extensions being arcuately curved in conformity with the circumference of the annular flange and terminated in a reinforced edge for resisting deformation of the arcuately curved configuration, the reinforced edges being located generally in a common plane normal to the axis of the wheel structure, and a plurality of retention elements projecting radially outwardly from said extensions between their axially inner and outer ends and between the circumferential ends of their associated reinforced edges and having axially and radially outwardly directed straight edges in circumferential alignment for gripping retaining engagement with said axial flange, said retention elements having rigid back-up portions between their axially and radially outwardly directed edges and the arcuately configured portions of the extensions to prevent substantial relative movement between said outwardly directed edges and their associated extensions.

4. In a wheel structure having rim and body parts including a side flange and an axial flange located radially and axially inward of the side flange, a cover disposed at the outer side of the wheel structure having an outer circular portion seated on said side flange, and having extending rearwardly and radially inwardly from said circular portion a continuous annular flange provided with a plurality of extensions resiliently yieldable in a radial direction and mutually resisting such yielding by the common connection through said flange, each of said extensions being arcuately curved in conformity with the circumference of the annular flange and terminated in a reinforced edge for resisting deformation of the arcuately curved configuration, the reinforced edges being located generally in a common plane normal to the axis of the wheel structure, and a plurality of retention elements projecting radially outwardly from said extensions from locations adjacent to but axially outward of said reinforcing edge and between the circumferential ends of their associated reinforced edges, said retention elements having radially outer edge extremities which extremities are generally straight in a circumferential direction and lie in a circle which is larger, when the cover is in an unstressed condition, than said axial flange, and such straight extremities are in gripping engagement with said axial flange as an incident to the outward resilient pressure exerted by said annular flange and its extensions.

5. In a wheel structure having rim and body parts including a side flange and an axial flange located radially and axially inward of the side flange, a cover for disposition at the outer side of the wheel structure having an outer circular portion seated on said side flange, and having extending rearwardly and radially inwardly from said circular portion a continuous annular flange provided with a plurality of extensions resiliently yieldable in a radial direction and mutually resisting such yielding by the common connection through said flange, each of said extensions being arcuately curved in conformity with the circumference of the annular flange and terminating in a reinforced edge for resisting deformation of the arcuately curved configuration, the reinforced edges of said extensions being located generally in a common plane normal to the axis of said cover, each of said extensions having between its ends a series of circumferentially aligned slots and a series of relatively rigid retention elements deflected radially outwardly from the material of said extensions at locations immediately inward axially of said slots, each of said retention elements having for its radially and axially outer edge the inner edge of the associated slot and being joined integrally at its sides and innermost end with its extension, the outer edges of said retention elements defining a circle which before the cover is mounted on the wheel structure is larger than the diameter of said axial flange, and when the cover is mounted in operative position at the outer side of the wheel structure such circle is reduced to the diameter of the axial flange where engaged by such edges, the reduction in diameter of said circle being realized essentially by radially inward deflection of the extensions.

6. In a wheel structure having rim and body parts including a side flange and an axial flange located radially and axially inward of the side flange, a cover for disposition at the outer side of the wheel structure having a circular portion seated on said side flange, and having extending rearwardly and radially inwardly from said circular portion a continuous annular flange including a plurality of extensions resiliently yieldable in a radial direction and mutually resisting such yielding by the common connection through said annular flange, each of said extensions being arcuately curved and terminating in a reinforced edge, said annular flange having a series of circumferentially aligned slots and a series of associated relatively rigid retention elements deflected radially outwardly from the material of said annular flange at locations immediately inward axially of said slots, said retention elements and said slots being located so that at least a portion of each retention element is in an associated extension, said retention elements each comprising a flat central portion having one end integral with and adjacent to the reinforced edge of its extension, said central portion being sloped radially outwardly and axially forwardly at an acute angle relative to the annular flange with the opposite end of the flat central portion forming an edge of the associated slot and being radially outwardly spaced from the annular flange and forming a straight circumferentially aligned blunt edge of the retention element, and with the opposite side edges of the central portion each being connected to the annular flange by a flat triangular shaped side portion, each side portion having three leg forming edges, with one of said three legs formed by its adjacent flat portion side edge, another of said three legs being integral with said annular flange and the third of said legs being a part of the edge of the associated slot and sloping from said opposite edge to said annular flange.

References Cited in the file of this patent
UNITED STATES PATENTS

| | | |
|---|---|---|
| 2,660,478 | Lyon | Nov. 24, 1953 |
| 2,669,487 | Horn | Feb. 16, 1954 |
| 2,870,879 | Gaylord et al. | Jan. 27, 1959 |
| 2,984,518 | Lyon | May 16, 1961 |
| 2,989,345 | Lyon | June 20, 1961 |
| 3,022,112 | Malhern | Feb. 20, 1962 |
| 3,071,416 | Leich | Jan. 1, 1963 |

FOREIGN PATENTS

| | | |
|---|---|---|
| 564,740 | Canada | Oct. 14, 1958 |